US010286759B2

(12) United States Patent
Flores Diaz

(10) Patent No.: US 10,286,759 B2
(45) Date of Patent: May 14, 2019

(54) VEHICLE DOOR INCLUDING AN INNER STRUCTURE HAVING A STORAGE COMPARTMENT WITH STRUCTURAL FEATURES THAT INCREASE THE STRENGTH OF THE STORAGE COMPARTMENT AND IMPROVE THE FEEL OF THE STORAGE COMPARTMENT

(71) Applicant: GM Global Technology Operations LLC, Detroit, MI (US)

(72) Inventor: Eliseo Arturo Flores Diaz, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/494,996

(22) Filed: Apr. 24, 2017

(65) Prior Publication Data
US 2018/0304728 A1   Oct. 25, 2018

(51) Int. Cl.
*B60J 5/04* (2006.01)
*B60R 7/04* (2006.01)
*B60R 11/00* (2006.01)

(52) U.S. Cl.
CPC ........... *B60J 5/0413* (2013.01); *B60J 5/0469* (2013.01); *B60R 7/046* (2013.01); *B60R 2011/0021* (2013.01)

(58) Field of Classification Search
CPC ....... B60J 5/0469; B60J 5/0413; B60R 7/046; B60R 2011/0021
See application file for complete search history.

(56) References Cited

U.S. PATENT DOCUMENTS 5,820,191 A * 10/1998 Blakewood, Jr. ...... B60J 5/0413
296/37.13

\* cited by examiner

*Primary Examiner* — D Glenn Dayoan
*Assistant Examiner* — Melissa A Black

(57) ABSTRACT

A door inner structure includes a first vertical wall, a second vertical wall, a floor, a lip, and a plurality of vertical ribs. The second vertical wall is disposed laterally inboard of the first vertical wall. The floor extends between and is connected to the first vertical wall and the second vertical wall. The first vertical wall, the second vertical wall, and the floor cooperate to define a storage compartment. The storage compartment has an open end that provides access to the storage compartment. The lip extends from a top edge of the second vertical wall toward the first vertical wall. The plurality of vertical ribs is disposed below the lip and extends from the second vertical wall. Each of the plurality of vertical ribs is connected to an outer surface of the second vertical wall and to an underside surface of the lip.

20 Claims, 5 Drawing Sheets

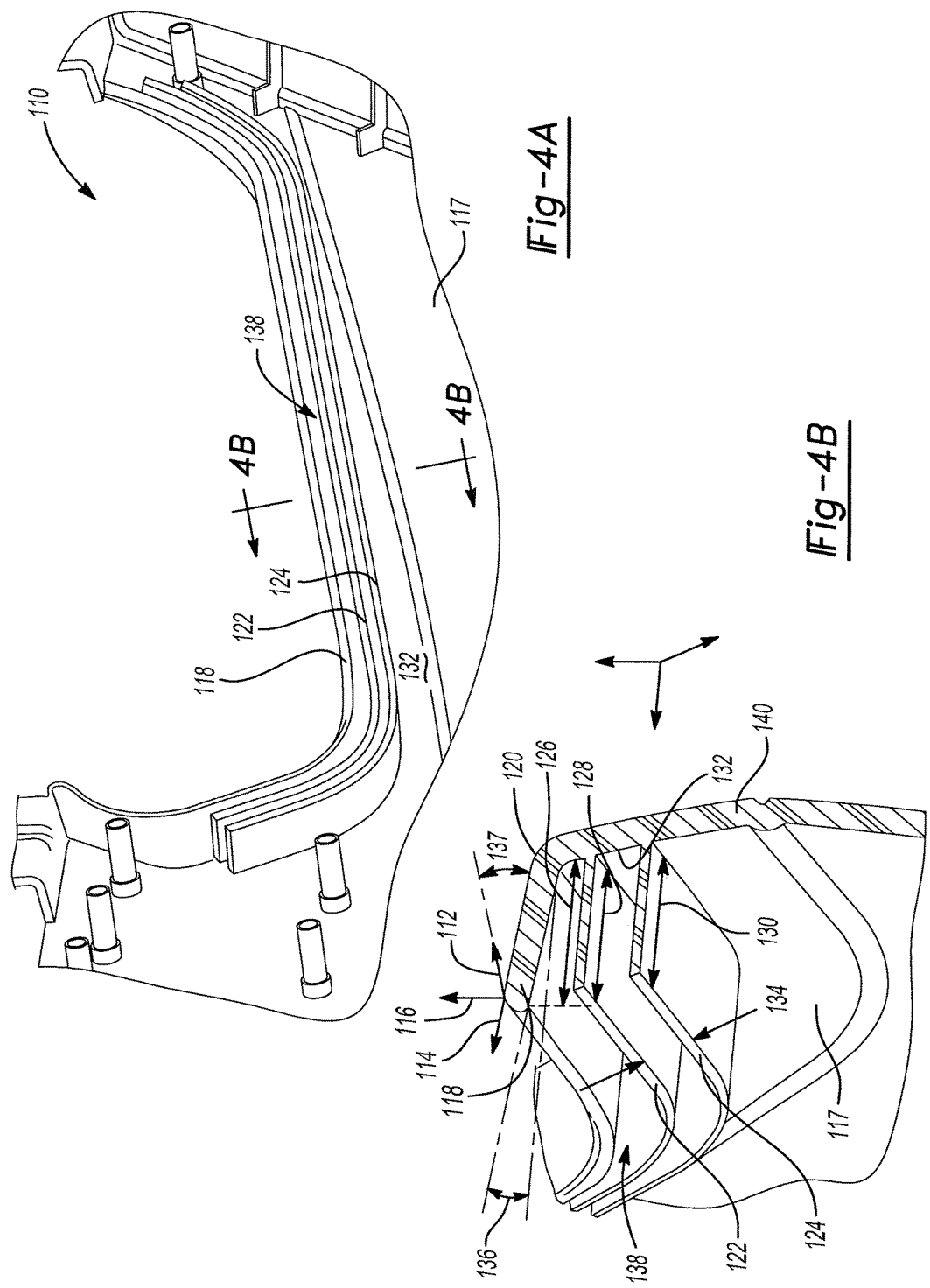

VEHICLE DOOR INCLUDING AN INNER STRUCTURE HAVING A STORAGE COMPARTMENT WITH STRUCTURAL FEATURES THAT INCREASE THE STRENGTH OF THE STORAGE COMPARTMENT AND IMPROVE THE FEEL OF THE STORAGE COMPARTMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle doors including an inner structure having a storage compartment with structural features that increase the strength of the storage compartment and improve the feel of the storage compartment.

A door assembly of a vehicle typically includes a door outer structure disposed on the exterior of the vehicle and a door inner structure disposed in the interior of the vehicle. The door outer structure is typically made of sheet metal, and the door inner structure is typically made of plastic. The door inner structure typically includes an armrest and a storage compartment disposed below the armrest for storing items such as a map. Various components are often mounted to the door inner structure. Examples of these components include a handle, a switch panel for window switches and/or lock switches, a window opening and closing mechanism, and/or speakers.

SUMMARY

The present disclosure provides an inner structure of a door of a vehicle. The door inner structure includes a first vertical wall, a second vertical wall, a floor, a lip, and a plurality of vertical ribs. The second vertical wall is disposed laterally inboard of the first vertical wall. The floor extends between and is connected to the first vertical wall and the second vertical wall. The first vertical wall, the second vertical wall, and the floor cooperate to define a storage compartment. The storage compartment has an open end that provides access to the storage compartment. The lip extends from a top edge of the second vertical wall toward the first vertical wall. The plurality of vertical ribs is disposed below the lip and extends from the second vertical wall. Each of the plurality of vertical ribs is connected to an outer surface of the second vertical wall and to an underside surface of the lip.

In some configurations, the plurality of vertical ribs are spaced apart from one another by a distance of less than or equal to about 6 mm.

In some configurations, the door inner structure also includes a horizontal rib. The horizontal rib is disposed below the plurality of vertical ribs and extends from the second vertical wall toward the first vertical wall. The plurality of vertical ribs are connected to the outer surface of the second vertical wall, the underside surface of the lip, and a top surface of the horizontal rib.

In some configurations, the lip, the horizontal rib, and the plurality of vertical ribs are integrally formed with the second vertical wall.

In some configurations, opposing surfaces of the lip and the horizontal rib form an angle that is greater than or to −5 degrees and less than or equal to 5 degrees.

In some configurations, the horizontal rib and each of the plurality of vertical ribs have a thickness of greater than or equal to 0.8 mm to less than or equal to 1.6 mm.

In some configurations, the door inner structure also includes a longitudinal channel formed at least partially by the plurality of vertical ribs. The longitudinal channel has an open end facing the first vertical wall.

In some configurations, the longitudinal channel is formed by a notch in each of the plurality of vertical ribs and the underside surface of the lip.

In some configurations, the door inner structure further includes a skin at least partially covering the outer surface of the second vertical wall. The skin includes a longitudinal seam that is aligned with and disposed in the longitudinal channel.

In some configurations, the seam joins a first portion of the skin and a second portion of the skin to one another. The first portion of the skin extends downward from the seam over the plurality of vertical ribs, laterally inward below the horizontal rib, and downward toward the floor of the storage compartment to at least partially cover the outer surface of the second vertical wall. The second portion extends upward from the seam, laterally inward above the lip, and downward from the top edge of the second vertical wall to at least partially cover an inner surface of the second vertical wall.

In some configurations, the first portion of the skin extends downward to the floor of the storage compartment to completely cover the outer surface of the second vertical wall.

The present disclosure provides another inner structure of a door of a vehicle. The door inner structure includes a first vertical wall, a second vertical wall, a floor, a lip, and a first horizontal rib. The second vertical wall is disposed laterally inboard of the first vertical wall. The floor extends between and is connected to the first vertical wall and the second vertical wall. The first vertical wall, the second vertical wall, and the floor cooperate to define a storage compartment. The storage compartment has an open end that provides access to the storage compartment. The lip extends from a top edge of the second vertical wall toward the first vertical wall by a first amount. The first horizontal rib is disposed below and spaced apart from the lip and extends from the second vertical wall by a second amount that is less than or equal to the first amount.

In some configurations, the door inner structure further includes a second horizontal rib disposed below and spaced apart from the first horizontal rib. The second horizontal rib extends from the second vertical wall toward the first vertical wall by a third amount that is less than or equal to the first amount.

In some configurations, each of the second and third amounts is less than the first amount.

In some configurations, each of the first, second, and third amounts is greater than or equal to 10 mm.

In some configurations, the lip, the first horizontal rib, and the second horizontal rib are integrally formed with the second vertical wall.

In some configurations, the first horizontal rib is spaced apart from the second horizontal rib by a distance that is less than or equal to 6 mm.

In some configurations, the door inner structure further includes a skin at least partially covering an outer surface of the second vertical wall. The skin includes a longitudinal seam that is aligned with and projects into a channel that is disposed between the lip and the first horizontal rib.

In some configurations. The seam separates the skin into a first portion and a second portion. The first portion of the skin extends downward from the seam and over the horizontal rib and the second horizontal rib to at least partially cover the outer surface of the second vertical wall. The second portion extends upward from the seam, laterally inward above the lip, and downward from the top edge of the second vertical wall to at least partially cover an inner surface of the second vertical wall.

In some configurations, opposing surfaces of the lip and the first horizontal rib form an angle that is greater than or equal to about −5 degrees and less than or equal to about 5 degrees.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A is a perspective view of another vertical wall of a storage compartment according to certain aspects of the present disclosure; and FIG. 4B is a cross sectional view of the inner vertical wall of FIG. 4A taken at line 4B-4B.

In the drawings, reference numbers may be reused to identify similar and/or identical elements.

DETAILED DESCRIPTION

Figure 1:
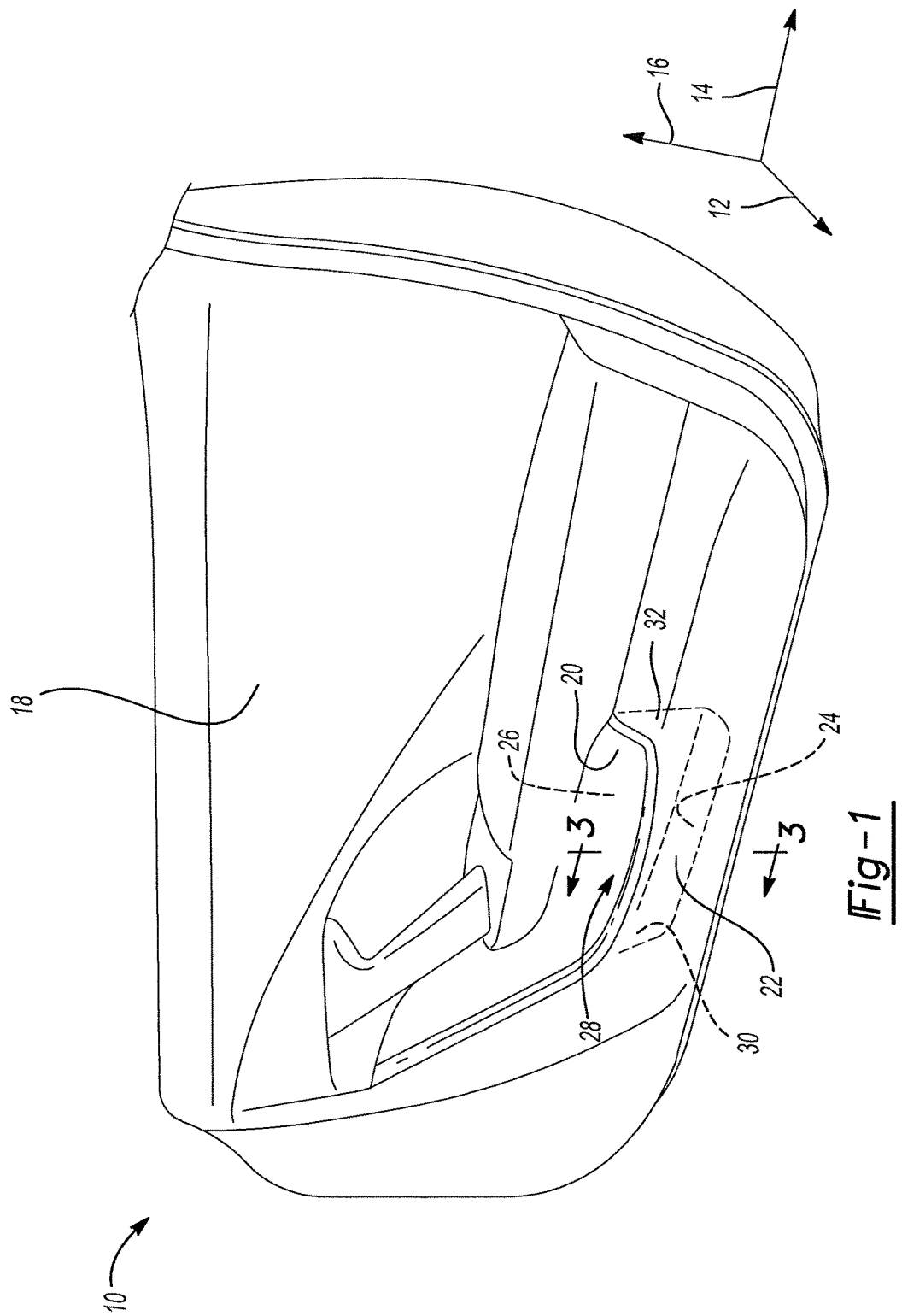
FIG. 1 is a perspective view of a vehicle door including a storage compartment according to certain aspects of the present disclosure.

As discussed above, a vehicle door typically includes a door outer structure disposed on the exterior of the vehicle, a door inner structure disposed in the interior of the vehicle, and a handle attached to the door inner structure. Occasionally, an occupant of a vehicle closes the door by grabbing a storage compartment of the door inner structure instead of the handle, and then pulling the door toward the interior of the vehicle. Closing the door in this manner may cause the storage compartment to crack.

Some door assemblies include a reinforcement bracket that is placed over a top edge of the storage compartment to prevent the storage compartment from cracking. However, a separate bracket adds an additional operation to the door assembly process, and the cost of the bracket increases the overall cost of the door. In addition, the bracket and the rest of the inner door structure are typically made from two different materials, and contact with the two different materials may cause an objectionable feel when a vehicle occupant grabs the storage compartment to close the door.

Some storage compartments include horizontal ribs near the edge of the storage compartment to prevent the storage compartment from cracking. However, the ribs are not typically covered by a skin, and therefore a vehicle occupant may be in direct contact with the ribs when the occupant grabs the storage compartment to close the door. In addition, when the occupant contacts the ribs, the contact often causes an objectionable feel to the occupant due to the design of the ribs.

An inner door structure according to the present disclosure includes an inner vertical wall and an outer vertical wall that cooperate with one another to define a storage compartment. In one example, the inner vertical wall includes a top edge or lip, a plurality of vertical ribs disposed below the lip and projecting into the storage compartment, and a horizontal rib disposed below the vertical ribs. Each of the vertical ribs has a notch, and the notches cooperate with one another to define a longitudinal channel. The ribs are completely covered by a skin, and a seam of the skin is place in the longitudinal channel so that the contact surface of the seam is flush with the contact surface of the remainder of the skin. The skin and the vertical orientation of the ribs prevent a vehicle occupant from experiencing an objectionable feel when grabbing the storage compartment.

In another example, the inner vertical wall includes upper and lower horizontal ribs disposed below the lip and projecting into the storage compartment. The amount by which the horizontal ribs project into the storage compartment is less than or equal to the amount by which the lip projects into the storage compartment. In addition, the spacing between the horizontal ribs is small enough to prevent a vehicle occupant from inserting his or her fingers between the ribs, which prevents the occupant from getting his or her fingers trapped between the ribs. Further, the ribs are completely covered by a skin, and the upper rib cooperates with the lip to define a longitudinal channel that receives a seam of the skin so that the exposed surface of the skin is smooth and substantially free of bumps. The amount by which the ribs project from the inner vertical wall, the spacing between the ribs, and the skin prevent a vehicle occupant from experiencing an objectionable feel when grabbing the storage compartment.

Referring to FIG. 1, a door 10 of a vehicle according to certain aspects of the present disclosure is shown. The door 10 is described with respect to an x-direction parallel to an x-axis 12, a y-direction parallel to a y-axis 14, and a z-direction parallel to a z-axis 16. The x-axis 12 extends laterally between sides of the vehicle, for example, from a passenger side to a driver side. The y-axis 14 extends longitudinally between a front of the vehicle and a back of the vehicle. The z-axis 16 extends between a bottom of the vehicle and a top of the vehicle.

Figure 3:
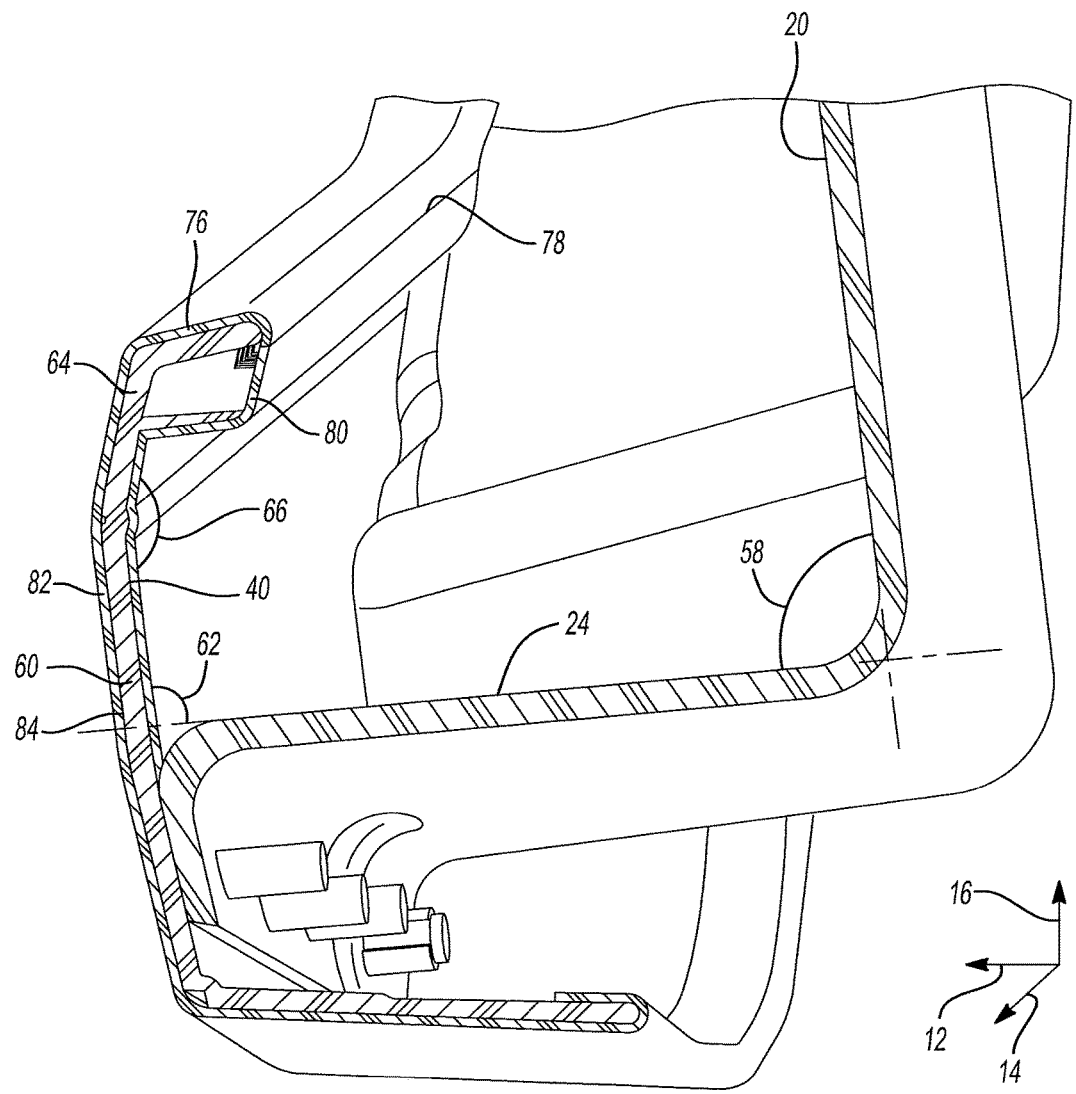
FIG. 3 is a cross sectional view of the storage compartment of FIG. 1 taken at line 3-3.

The door 10 includes an inner structure 18. The inner structure 18 includes a first vertical wall 20, a second vertical wall 22, and a floor 24. The first vertical wall 20 and a majority of the second vertical wall 22 are disposed within planes that are substantially aligned with the z-axis 16. The second vertical wall 22 is disposed laterally inboard (i.e., toward the interior of the vehicle) of the first vertical wall 20 substantially along the x-axis 12. The floor 24 extends between the first vertical wall 20 and the second vertical wall 22 and is connected to the first vertical wall 20 and the second vertical wall 22. The floor 24 is integrally formed with the first vertical wall 20 (as best shown in FIG. 3). As used herein, terms of degree such as "substantially," "approximately," and "about" mean exactly that which is specified or nearly that which is specified while allowing for some variation due to manufacturing tolerances.

The first vertical wall 20, the second vertical wall 22, and the floor 24 cooperate to define a storage compartment 26. The storage compartment 26 has an open end 28 that provides access to the storage compartment 26. The first vertical wall 20 wraps around the storage compartment 26 to form front and back walls 30, 32. The front wall 30 and the back wall 32 are integrally formed with the first vertical wall 20.

Figure 2A:
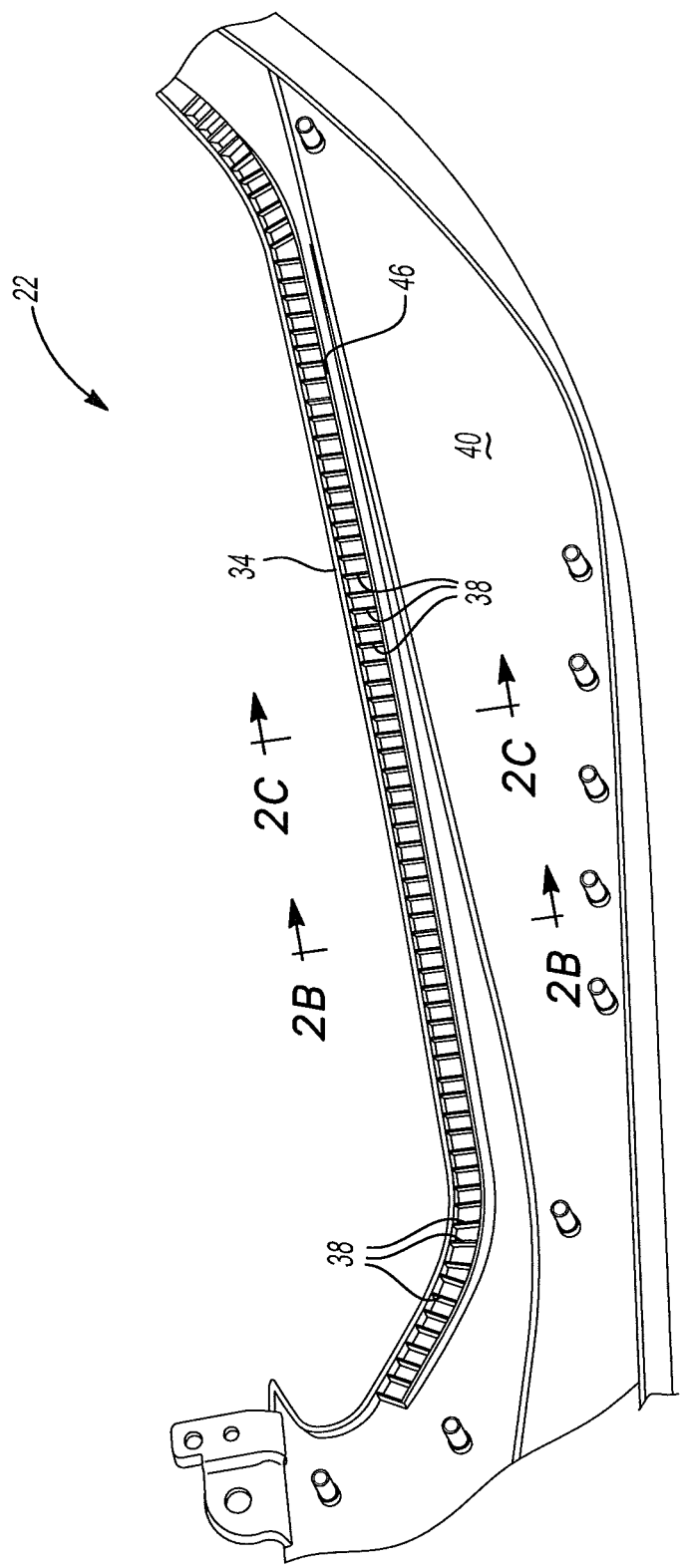
FIG. 2A is a perspective view of an inner vertical wall of the storage compartment of FIG. 1.
Figure 2B:
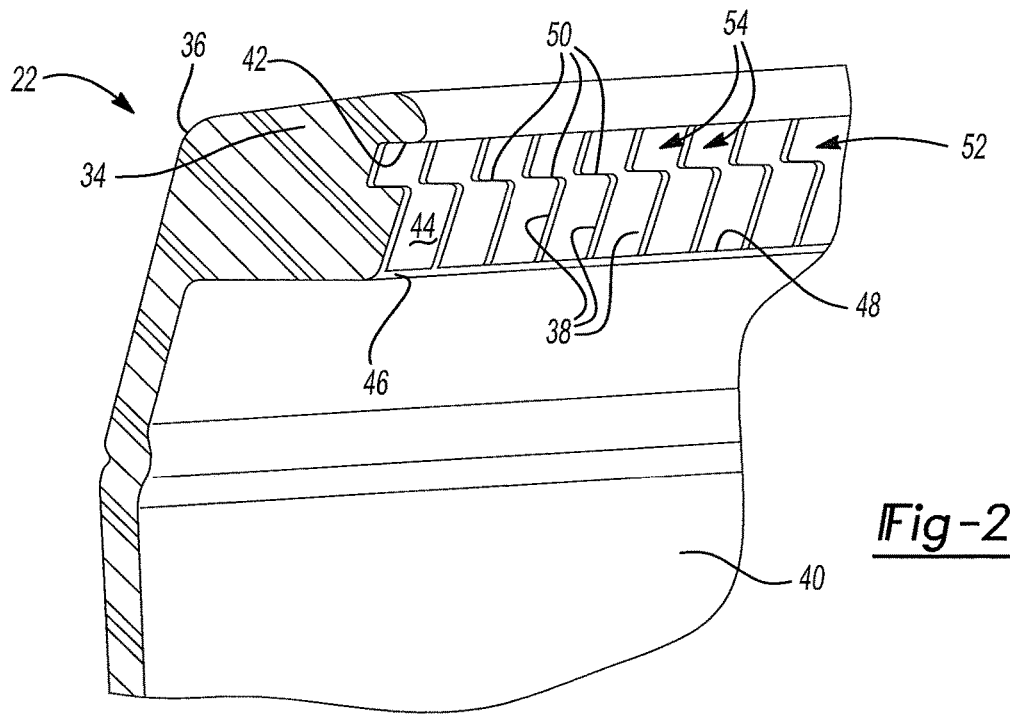
FIG. 2B is a cross sectional view of the inner vertical wall of FIG. 2A taken at line 2B-2B.
Figure 2C:
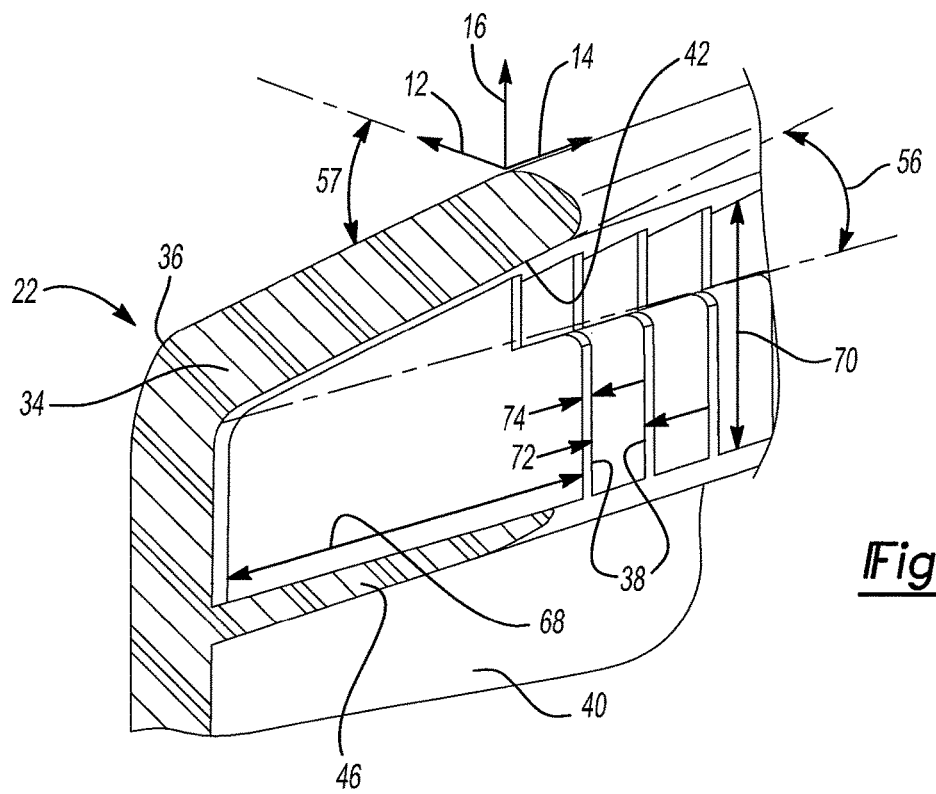
FIG. 2C is a cross sectional view of the inner vertical wall of FIG. 2A taken at line 2C-2C.

With reference to FIGS. 2A-2C, a lip 34 extends from a top edge 36 of the second vertical wall 22 toward the first vertical wall 20. A plurality of vertical ribs 38 extend from the second vertical wall 22 toward the first vertical wall 20. The vertical ribs 38 are integrally formed with the second vertical wall 22. The vertical ribs 38 are disposed below (i.e., in substantially the z-direction) the lip 34. Each of the vertical ribs 38 is connected to an outer surface 40 of the second vertical wall 22 and to an underside surface 42 of the lip 34. Each of the vertical ribs 38 includes a side surface 44 that is approximately perpendicular to the outer surface 40 of the second vertical wall 22.

A horizontal rib 46 extends from the second vertical wall 22 toward the first vertical wall 20. A majority of the horizontal rib 46 is horizontal or disposed within a plane that is substantially aligned with the y-axis 14. The horizontal rib 46 is disposed below (i.e., in substantially the z-direction) the lip 34. The vertical ribs 38 are connected to the outer surface 40 of the second vertical wall 22, the underside surface of the lip 34, and a top surface 48 of the horizontal rib 46. The horizontal rib 46 is integrally formed with the second vertical wall 22. The lip 34, each pair of adjacent ones of the vertical ribs 38, and the horizontal rib 46 cooperate to define a box section that provides structural rigidity to the second vertical wall 22. This structural rigidity extends the life of the door inner structure 18 and prevents damage or distortion of the second vertical wall 22, particularly when it is used as a handle to close or open the door 10 of the vehicle.

Each of the vertical ribs 38 includes a notch 50 adjacent to the lip 34. The notches 50 cooperate with the underside surface 42 of the lip 34 to form a longitudinal channel 52. Thus, the longitudinal channel 52 is formed at least partially by the plurality of vertical ribs 38. The longitudinal channel 52 has an open end 54 facing the first vertical wall 20.

The horizontal rib 46 forms a first angle 56 with the lip 34. The first angle 56 is greater than or equal to about −5 degrees to less than or equal to about 5 degrees. The first angle 56 is optionally about 0 degrees or approximately parallel to the lip 34. The lip 34 forms a second angle 57 with respect to the x-axis 12. The second angle 57 is greater than or equal to about 5 degrees to less than or equal to about 15 degrees, optionally about 10 degrees.

With reference to FIG. 3, the first vertical wall 20 forms a third angle 58 with the floor 24. The third angle 58 is greater than or equal to about 85 degrees to less than or equal to about 95 degrees, optionally about 90 degrees. A bottom section 60 of the second vertical wall 22 forms a fourth angle 62 with the floor 24. The fourth angle 62 is greater than or equal to about 85 degrees to less than or equal to about 95 degrees, optionally about 90 degrees. The second vertical wall 22 includes a top section 64 that forms a fifth angle 66 with the bottom section 60 of the second vertical wall 22. The fifth angle 66 is greater than or equal to about 155 degrees to less than or equal to about 170 degrees, optionally greater than or equal to about 160 degrees to less than or equal to about 165 degrees, optionally about 163 degrees.

Returning to FIG. 2C, each of the vertical ribs 38 extends laterally from the outer surface 40 of the second vertical wall 22 by a first distance 68. The first distance 68 is greater than or equal to about 8 mm to less than or equal to about 14 mm, optionally about 11 mm. Each of the vertical ribs 38 extends between the top surface 48 of the horizontal rib 46 and the underside surface 42 of the lip 34 by a second distance 70. The second distance 70 is greater than or equal to about 8 mm to less than or equal to about 12 mm, optionally about 10 mm. The vertical ribs 38 are spaced apart from one another by a third distance 72. The third distance is greater than or equal to about 4 mm to less than or equal to about 8 mm, optionally about 6 mm. Each vertical rib 38 has a thickness 74 that is greater than or equal to about 0.8 mm and less than or equal to about 1.6 mm, optionally about 1.2 mm.

Referring to FIG. 3, the door inner structure 18 also includes a skin 76. The skin 76 at least partially covers the outer surface 40 of the second vertical wall 22. The skin 76 includes a longitudinal seam 78 that is aligned with and disposed in the longitudinal channel 52. The first vertical wall 20 may be made from a soft plastic such as carpet (polypropylene (PP)+polyethylene (PE)) or polyolefin alloy (polypropylene (PP)+ethylene propylene diene monomer (EPDM)). The second vertical wall 22 may be made from a hard plastic such as acrylonitrile butadiene styrene (ABS) or polyolefin alloy. The skin 76 may be made from a softer material, such as real leather, polyvinyl chloride (PVC), or polyolefin alloy.

The longitudinal seam 78 joins a first portion 80 of the skin 76 with a second portion 82 of the skin 76. The first portion 80 of the skin 76 extends downward (i.e., in substantially the z-direction) from the longitudinal seam 78 over the vertical ribs 38, laterally inward (i.e., in substantially the x-direction) below the horizontal rib 46, and downward toward the floor 24 of the storage compartment 26. The first portion 80 of the skin 76 extends downward to the floor 24 of the storage compartment 26 to completely cover the outer surface 40 of the second vertical wall 22. Thus, the skin 76 prevents exposure of the vertical ribs 38 to cover spaces between the vertical ribs 38 where a vehicle occupants" fingers could get trapped. The skin 76 therefore reduces the potential for injury or discomfort when a vehicle occupant grabs the storage compartment 26. The spacing between the vertical ribs 38 further reduces this potential and prevents damage to the skin 76 by preventing a vehicle occupant from pushing the skin into the space between the vertical ribs 38.

The second portion 82 of the skin 76 extends upward (i.e., in substantially the z-direction), laterally inward above the lip 34, and downward from the top edge 36 of the second vertical wall 22. Thus, the second portion 82 of the skin 76 completely covers an inner surface 84 of the second vertical wall 22. Since the longitudinal seam 78 of the skin 76 is disposed in the in the longitudinal channel 52, the exposed surface of seam 78 is flush with the exposed surfaces of the first and second portions 80, 82 of the skin 76 that are adjacent to the seam 78. Thus, an exposed surface of the skin that may come in contact with a vehicle occupant is smooth and substantially free of bumps or ridges that may be tactually displeasing.

The longitudinal channel 52 serves as an alignment feature for the skin 76. More particularly, the first and second portions 80, 82 of the skin 76 can be aligned within the channel 52 prior to fixing the skin 76 to the second vertical wall 22 to prevent wrinkles and material accumulation. After the skin 76 is smooth and properly aligned, it can be attached to the second vertical wall 22, for example, with heat-cured adhesive.

Referring now to FIGS. 4A-4B, another door inner structure 110 according to certain aspects of the present disclosure is shown. The door inner structure 110 is described with respect to an x-direction parallel to an x-axis 112, a y-direction parallel to a y-axis 114, and a z-direction parallel to a z-axis 116 that are similar to the x-, y-, and z-axes 12, 14, 16 of FIGS. 1-3.

The inner structure 110 includes a first vertical wall (not shown) similar or identical to the first vertical wall 20 of the door 10 of FIGS. 1-3, a second vertical wall 117, and a floor (not shown) similar or identical to the floor 24 of the door 10 of FIGS. 1-3. The first vertical wall and a majority of the second vertical wall 117 are disposed within planes that are substantially aligned with the z-axis 116. The second vertical wall 117 is disposed laterally inboard (i.e., toward the interior of the vehicle) of the first vertical wall substantially along the x-axis 112. The floor extends between the first vertical wall and the second vertical wall 117 and is connected to the first vertical wall and the second vertical wall 117. The floor is integrally formed with the first vertical wall.

The first vertical wall, the second vertical wall 117, and the floor cooperate to define a storage compartment (not shown), similar to the storage compartment 26 of the door 10 of FIGS. 1-3. The first vertical wall wraps around the storage compartment to form front and back walls (not shown) similar or identical to the front and back walls 30, 32 of the door 10 of FIGS. 1-3.

A lip 118 extends from a top edge 120 of the second vertical wall 117 toward the first vertical wall. A first horizontal rib 122 is disposed below (i.e., in substantially the z-direction) the lip 118. The first horizontal rib 122 extends from the second vertical wall 117 toward the first vertical wall. A second horizontal rib 124 is disposed below the first horizontal rib 122. The second horizontal rib 124 extends from the second vertical wall 117 toward the first vertical wall. The lip 118, the first horizontal rib 122, and the second horizontal rib 124 are integrally formed with the second vertical wall 117. The first and second horizontal ribs 122, 124 provide structural rigidity to the inner structure 110 to decrease damage and wear when the second vertical wall 117 is exposed to stress.

The lip 118 extends from the second vertical wall 117 by a first amount 126, the first horizontal rib 122 extends from the second vertical wall 117 by a second amount 128, and the second horizontal rib 124 extends from the second vertical wall 117 by a third amount 130. The first, second, and third amounts 126, 128, 130 are each measured in a direction substantially perpendicular to a plane defined by an outer surface 132 of the second vertical wall 117.

The second and third amounts 128 and 130 are less than or equal to the first amount 126. The third amount 130 is less than or equal to the first amount 126. The second amount 128 and the third amount 130 may be equal to one another as shown. Each of the first, second, and third amounts 126, 128, 130 is greater than or equal to about 8 mm, optionally greater than or equal to about 10 mm, optionally about 11 mm.

The relationships between the first, second, and third amounts 126, 128, and 130 reduce the potential for finger injury or discomfort. More specifically, where the second and third amounts 128 and 130 are less than or equal to the first amount 126, the vehicle occupant is less likely to slide his or her hand into the storage compartment and stub his or her fingers on the first horizontal rib 122. In contrast, in designs where the second and third amounts 128 and 130 are greater than the first amount 126, the vehicle occupant is more likely to slide his or her hand over the lip 118 and collide with the first horizontal rib 122, causing injury or discomfort.

The first horizontal rib 122 is spaced apart from the second horizontal rib 124 by a distance 134. The distance 134 is greater than or equal to about 4 mm to less than or equal to about 8 mm, optionally about 6 mm. The lip 118 forms a first angle 136 with respect to the first horizontal rib 122. The first angle 136 is greater than or equal to about −5 degrees to less than or equal to about 5 degrees, optionally about 0 degrees. The lip 118 forms a second angle 137 with respect to the x-axis 112. The second angle 137 is greater than or equal to about 5 degrees to less than or equal to about 15 degrees, optionally about 10 degrees.

The door inner structure 110 may also include a skin (not shown) similar to the skin 76 of the door 10 of FIGS. 1-3. The skin at least partially covers the outer surface 132 of the second vertical wall 117. The skin includes a first portion, a second portion, and a longitudinal seam joining the first and second portions to each other. The first portion, the second portion, and the longitudinal seam are similar or identical to the first portion 80, second portion 82, and the longitudinal seam 78 of the door 10 of FIGS. 1-3. The longitudinal seam is aligned with and projects into a channel 138 that is disposed between the lip 118 and the first horizontal rib 122.

The first portion of the skin extends downward (i.e., in substantially the z-direction) from the seam and over the first horizontal rib 122 and the second horizontal rib 124. Thus, the first portion of the skin at least partially covers the outer surface 132 of the second vertical wall 117. The second portion extends upward (i.e., in substantially the z-direction) from the seam, laterally inward above the lip 118, and downward from the top edge 120 of the second vertical wall 117. Thus, the second portion of the skin at least partially covers an inner surface 140 of the second vertical wall 117.

The skin provides similar advantages as the skin 76 of the door 10 of FIGS. 1-3. More particularly, the skin is tactually pleasing and it reduces the potential for finger injury or discomfort during use of the storage compartment by eliminating the exposure of spaces between the lip 118 and the first and second horizontal ribs 122 and 124. The spacing between the first and second horizontal ribs 124 further reduce this potential and prevent damage to the skin by preventing a vehicle occupant from pushing the skin into the space between the first and second horizontal ribs 122 and 124.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The invention claimed is:

1. An inner structure of a door of a vehicle, the door inner structure comprising:
   a first vertical wall;
   a second vertical wall disposed laterally inboard of the first vertical wall;
   a floor extending between and connected to the first vertical wall and the second vertical wall, wherein the first vertical wall, the second vertical wall, and the floor cooperate to define a storage compartment, the storage compartment having an open end that provides access to the storage compartment;
   a lip extending from a top edge of the second vertical wall toward the first vertical wall by a first amount; and
   a plurality of vertical ribs disposed below the lip and extending from the second vertical wall toward the first vertical wall by a second amount, wherein each of the plurality of vertical ribs is connected to an outer surface of the second vertical wall and to an underside surface of the lip, and the second amount is less than or equal to the first amount.

2. The door inner structure of claim 1, wherein the plurality of vertical ribs are spaced apart from one another by a distance of less than or equal to about 6 mm.

3. The door inner structure of claim 1, further comprising a horizontal rib disposed below the plurality of vertical ribs and extending from the second vertical wall toward the first vertical wall, wherein plurality of vertical ribs are connected to the outer surface of the second vertical wall, the underside surface of the lip, and a top surface of the horizontal rib.

4. The door inner structure of claim 3, wherein the lip, the horizontal rib, and the plurality of vertical ribs are integrally formed with the second vertical wall.

5. The door inner structure of claim 3, wherein opposing surfaces of the lip and the horizontal rib form an angle that is greater than or equal to −5 degrees and less than or equal to 5 degrees.

6. The door inner structure of claim 3, wherein the horizontal rib and each of the plurality of vertical ribs have a thickness of greater than or equal to about 1millimeter (mm) to less than or equal to about 1.6 mm.

7. An inner structure of a door or a vehicle, the door inner structure comprising:
   a first vertical wall;
   a second vertical wall disposed laterally inboard of the first vertical wall;
   a floor extending between and connected to the first vertical wall and the second vertical wall, wherein the first vertical wall, the second vertical wall, and the floor cooperate to define a storage compartment, the storage compartment having an open end that provides access to the storage compartment;
   a lip extending from a top edge of the second vertical wall toward the first vertical wall by a first amount;
   a horizontal rib disposed below the plurality of vertical ribs and extending from the second vertical wall toward the first vertical wall, wherein plurality of vertical ribs are connected to the outer surface of the second vertical wall, the underside surface of the lip, and a top surface of the horizontal rib;
   a plurality of vertical ribs disposed below the lip and extending from the second vertical wall toward the first vertical wall by a second amount, wherein each of the plurality of vertical ribs is connected to an outer surface of the second vertical wall and to an underside surface of the lip, and the second amount is less than or equal to the first amount; and
   a longitudinal channel formed at least partially by the plurality of vertical ribs and having an open end facing the first vertical wall.

8. The door inner structure of claim 7, wherein the longitudinal channel is formed by a notch in each of the plurality of vertical ribs and the underside surface of the lip.

9. The door inner structure of claim 8, further comprising a skin at least partially covering the outer surface of the second vertical wall, wherein the skin includes a longitudinal seam that is aligned with and disposed in the longitudinal channel.

10. The door inner structure of claim 9, wherein:
   the seam joins a first portion of the skin and a second portion of the skin to one another;

the first portion of the skin extends downward from the seam over the plurality of vertical ribs, laterally inward below the horizontal rib, and downward toward the floor of the storage compartment to at least partially cover the outer surface of the second vertical wall; and the second portion extends upward from the seam, laterally inward above the lip, and downward from the top edge of the second vertical wall to at least partially cover an inner surface of the second vertical wall.

11. The door inner structure of claim 10, wherein the first portion of the skin extends downward to the floor of the storage compartment to completely cover the outer surface of the second vertical wall.

12. An inner structure of a door of a vehicle, the door inner structure comprising:
a first vertical wall;
a second vertical wall disposed laterally inboard of the first vertical wall;
a floor extending between and connected to the first vertical wall and the second vertical wall, wherein the first vertical wall, the second vertical wall, and the floor cooperate to define a storage compartment, the storage compartment having an open end that provides access to the storage compartment;
a lip extending from a top edge of the second vertical wall toward the first vertical wall by a first amount; and
a first horizontal rib disposed below and spaced apart from the lip and extending from the second vertical wall toward the first vertical wall by a second amount that is less than or equal to the first amount.

13. The door inner structure of claim 12, further comprising a second horizontal rib disposed below and spaced apart from the first horizontal rib and extending from the second vertical wall toward the first vertical wall by a third amount that is less than or equal to the first amount.

14. The door inner structure of claim 13, wherein each of the second and third amounts is less than the first amount.

15. The door inner structure of claim 13, wherein each of the first, second, and third amounts is greater than or equal to 10 mm.

16. The door inner structure of claim 13, wherein the lip, the first horizontal rib, and the second horizontal rib are integrally formed with the second vertical wall.

17. The door inner structure of claim 13, wherein the first horizontal rib is spaced apart from the second horizontal rib by a distance that is less than or equal to 6 mm.

18. The door inner structure of claim 13, further comprising a skin at least partially covering an outer surface of the second vertical wall, wherein the skin includes a longitudinal seam that is aligned with and projects into a channel that is disposed between the lip and the first horizontal rib.

19. The door inner structure of claim 18, wherein:
the seam separates the skin into a first portion and a second portion;
the first portion of the skin extends downward from the seam and over the first horizontal rib and the second horizontal rib to at least partially cover the outer surface of the second vertical wall; and
the second portion extends upward from the seam, laterally inward above the lip, and downward from the top edge of the second vertical wall to at least partially cover an inner surface of the second vertical wall.

20. The door inner structure of claim 13, wherein opposing surfaces of the lip and the first horizontal rib form an angle that is greater than or equal to about −5 degrees and less than or equal to about 5 degrees.

* * * * *